(12) United States Patent
Yamamoto et al.

(10) Patent No.: US 11,005,225 B2
(45) Date of Patent: *May 11, 2021

(54) DOCKING CRADLE FOR A COMPUTING DEVICE HAVING MULTIPLE MOUNTING ORIENTATIONS

(71) Applicant: Panasonic Avionics Corporation, Lake Forest, CA (US)

(72) Inventors: Yoshimi Yamamoto, Santa Ana, CA (US); Andrew Barnes, Mission Viejo, CA (US); David E. Diaz, Rancho Santa Margarita, CA (US)

(73) Assignee: PANASONIC AVIONICS CORPORATION, Lake Forest, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/889,692

(22) Filed: Jun. 1, 2020

(65) Prior Publication Data
US 2020/0403361 A1    Dec. 24, 2020

Related U.S. Application Data

(63) Continuation of application No. 16/447,899, filed on Jun. 20, 2019, now Pat. No. 10,707,632.

(51) Int. Cl.
| | | |
|---|---|---|
| *H01R 27/02* | (2006.01) | |
| *H01R 33/94* | (2006.01) | |
| *H01R 13/74* | (2006.01) | |
| *G06F 1/16* | (2006.01) | |
| *H01R 13/502* | (2006.01) | |
| *H01R 33/76* | (2006.01) | |
| *H01R 35/02* | (2006.01) | |

(52) U.S. Cl.
CPC .......... *H01R 33/94* (2013.01); *G06F 1/1632* (2013.01); *H01R 13/502* (2013.01); *H01R 13/74* (2013.01); *H01R 33/7685* (2013.01); *H01R 35/025* (2013.01); *H01R 2201/06* (2013.01)

(58) Field of Classification Search
CPC ... G06F 1/1632; H01R 33/94; H01R 33/7685; H01R 13/502; H01R 13/74; H01R 35/025; H01R 2201/06
USPC ......................................... 439/341, 640, 660
See application file for complete search history.

(56) References Cited

U.S. PATENT DOCUMENTS

| | | |
|---|---|---|
| 6,786,743 B2 | 9/2004 | Huang |
| 6,898,080 B2 | 5/2005 | Yin et al. |
| 7,066,753 B1 | 6/2006 | Tseng |
| 7,121,852 B2 | 10/2006 | Ng et al. |

(Continued)

*Primary Examiner* — Khiem M Nguyen
(74) *Attorney, Agent, or Firm* — Perkins Coie LLP

(57) ABSTRACT

The present disclosure relates to a docking cradle assembly for holding a computing device as disclosed herein. The docking cradle assembly comprises a cradle housing; a cover including an opening; and a connector assembly supported by the cover and having a connector positioned within the opening, the connector being rotatable between a first position, a second position substantially perpendicular to the first position, and a subset of positions each between the first and second positions and angularly displaced from the first position, wherein the cover is mountable to a first mounting surface and a second mounting surface angularly displaced from the first mounting surface by rotating the connector to a position suitable for the selected mounting surface in which the connector is inaccessible after the cover is mounted.

20 Claims, 12 Drawing Sheets

(56) References Cited

U.S. PATENT DOCUMENTS

| | | |
|---|---|---|
| 8,223,483 B2 | 7/2012 | Hayashida et al. |
| 8,323,040 B2 | 12/2012 | Prest |
| 8,481,832 B2 | 7/2013 | Lloyd |
| 8,535,102 B1 | 9/2013 | Colahan et al. |
| 8,721,356 B2 | 5/2014 | Webb et al. |
| 8,986,029 B2 | 3/2015 | Webb et al. |
| 9,075,573 B2 | 7/2015 | Hayashida et al. |
| 9,192,067 B2 | 11/2015 | Kim et al. |
| 9,201,453 B2 | 12/2015 | Stanley |
| 9,466,927 B2 | 10/2016 | Ardisana, II et al. |
| 9,742,107 B2 | 8/2017 | Choi et al. |
| 9,836,086 B2 | 12/2017 | Suckle et al. |
| 10,585,455 B1 | 3/2020 | Barnes |
| 2006/0061958 A1 | 3/2006 | Solomon et al. |
| 2006/0238497 A1 | 10/2006 | Velagapudi |
| 2006/0246742 A1 | 11/2006 | Sun |
| 2011/0170244 A1 | 7/2011 | Son et al. |
| 2012/0194455 A1 | 8/2012 | Hsu et al. |
| 2013/0201632 A1 | 8/2013 | Chen et al. |

DOCKING CRADLE FOR A COMPUTING DEVICE HAVING MULTIPLE MOUNTING ORIENTATIONS

CROSS-REFERENCE TO RELATED APPLICATIONS

The present application is a continuation of U.S. patent application Ser. No. 16/447,899, filed on Jun. 20, 2019, entitled "DOCKING CRADLE FOR A COMPUTING DEVICE HAVING MULTIPLE MOUNTING ORIENTATIONS", which is hereby incorporated herein by reference as if set forth in full.

BACKGROUND

Technical Field

This disclosure generally relates to docking cradles for computing devices, and more particularly, to a docking cradle for a handheld computing device which can mount to a mounting surface of any angular orientation in which the computing device is in the angular orientation.

Related Art

Many vehicles of common carriers, such as airplanes, passenger trains, buses, cruise ships, and the like, have individualized functional equipment dedicated to a particular passenger seat which can be utilized by the passenger, such as video and/or audio entertainment systems, adjustable seats, adjustable environmental controls, adjustable lighting, telephony systems, crew communication systems, and the like. For example, many commercial airplanes have individualized video and audio entertainment systems, often referred to as "in-flight entertainment" or "IFE" systems. Many IFE systems include communication capabilities and are frequently referred to as "in-flight entertainment and communication" or "IFEC" systems. IFE system as used herein includes IFEC systems.

As one example of a passenger seat function, the entertainment systems (e.g., an IFE system) for passenger carrier vehicles, such as commercial airlines, often include in-seat video display units installed at each passenger seat. For instance, video display units may be mounted at each of the seatbacks of the passenger seats and also at bulkheads and in arm rests of seats. The entertainment system includes a centralized entertainment system server which is networked to each of the video display units via a communication network. The entertainment system server distributes media content (e.g., videos, audio, movies, television shows, etc.) to each of the video display units. Generally, the entertainment system allows each passenger to select from multiple video channels and/or audio channels, and/or individually select and play videos and/or audio from a library of videos and audio content. The video displays may also provide games, communication applications (e.g., telephone service, messaging, etc.), internet browsing, and other computer applications. In some systems, the video displays may be smart monitors which can run computer applications and process and store data internally.

To operate the seat functions, such as the video display system, environmental controls, seat adjustment, etc., controls are provided on or near the passenger seat that allow the passenger to control the seat functions. The controls may be physical buttons, or on-screen interfaces displayed, for instance, on a touchscreen of the video display unit, or on a separate controller having a touchscreen display. For example, some commercial airplane entertainment systems have on-screen interfaces for controlling a reading light, activating a crew member call signal, as well as controlling the audio/video entertainment. Some systems utilize a tethered handheld controller or computing device which is connected via a cable to the video display unit or to an arm rest of the passenger seat. The cable electrically connects the handheld controller to the video display unit and also physically connects the controller to the seat location. Tethering of the handheld controller allows a passenger to conveniently hold the controller for controlling the seat functions, while also preventing the controller from being removed by the passenger from the particular seat, or from the vehicle itself. However, tethering the controller also has a number of shortcomings. The tethering cable can be a nuisance which interferes with the ingress/egress of adjacent passengers and access to a seatback tray or other articles in and around the seat, and also limits the range in which the controller can be located such as when a passenger reclines a seat or moves further from the tethered location.

In order to overcome some of the drawbacks of tethered handheld controllers, wireless handheld controllers have been disclosed. For example, U.S. Pat. No. 9,584,846 discloses a docking cradle for holding and locking a wireless, handheld controller in the cradle. The controller has a form factor similar to a mobile phone. The docking cradle has a recessed area for receiving and holding the controller and locking tabs which retain the controller in the cradle. The cradle also has an electronically controlled lock which locks and unlocks the button from being actuated to release the controller. The electronically controlled lock is controlled by a printed circuit board (PCB) attached to a support structure on the bottom of the cradle. As the cradle and support structure for the PCB are integrated, the cradle and PCB are not separable to provide multiple mounting options. That is, the disclosed docking cradle, as with many conventional docking cradles, is conceived to be installed in limited predetermine orientations, either on a horizontal or on a vertical surface. Often, these installation locations are constrained with limited access, especially in terms of routing of the wiring harness or space available for a receptacle connector coupled to a centralized entertainment system server and/or power supply sources.

Portable computer docking stations having movable electronic interfaces have been disclosed to overcome the drawback of limited interfacing orientations. For example, U.S. Pat. No. 6,898,080 discloses a docking station that includes a housing, and an electrical interface supported by the housing and configured to electrically couple the docking station and the portable computer. The electrical interface is movable between a first position and a second position that is perpendicular to the first position to accommodate differing locations of an electrical interface of the portable computer (e.g., to electrically couple with the interface of the portable computer that is either horizontally or vertically orientated). The docking station also includes ejectors protruding from the docking station that contact the portable computer while in the first and second position. The ejectors are actuated by an actuation button to disconnect the portable computer from electrical interface. The disclosed docking station provides for electrically coupling the portable computer to the docking station at multiple positions, but does not provide for a docking cradle that is mountable at multiple positions for holing the portable computer. Furthermore, as the position of the docking station is constrained to accommodate the electrical interface of the portable computer, the docking station provides for only two perpendicular configurations.

The present disclosure is directed toward overcoming one or more of the problems identified above and/or providing advantages over prior systems.

SUMMARY

A docking cradle assembly for mounting to a mounting surface and holding a computing device is disclosed herein. The docking cradle assembly comprises a cradle housing including a front side and a top side, the front side having a slot for receiving the computing device and a cover including a back side and a bottom side, and an opening, the back side being substantially parallel with the front side and adjacent to the top side, the bottom side being substantially parallel with the top side and adjacent to the front side. The docking cradle assembly also comprises a connector assembly supported by the cover between the cover and the cradle housing and having a connector positioned within the opening. The connector is rotatable between a plurality of positions about a longitudinal axis substantially parallel to bottom side and back side of the cover, where the plurality of positions comprises a first position substantially parallel to the bottom side, a second position substantially perpendicular to the first position, and a subset of positions each between the first position and the second position and angularly displaced from the first position. The connector is also configured to electrically couple the docking cradle assembly to an external system when in a selected position of the plurality of positions. The cover is mountable to a first mounting surface and a second mounting surface angularly displaced from the first mounting surface by rotating the connector to a position suitable for the selected mounting surface in which the connector is inaccessible after the cover is mounted.

In another aspect, a docking cradle assembly for electrically coupling a handheld computing device to a computer management system is disclosed herein. The docking cradle assembly comprises a cradle housing comprising a front side and a top side and a cover attached to the cradle housing and comprising a back side, a bottom side, and an opening positioned at an intersection of the back side and the bottom side. The docking cradle assembly also comprises a connector assembly between the cradle housing and the cover and aligned with the opening of the cover. The connector assembly comprises a connector and at least one shaft having a first end and a second end and a longitudinal axis that is substantially parallel to the back side and bottom side of the cover and the connector assembly is positioned within the opening and between the first end and the second end along the longitudinal axis. The docking cradle assembly further comprises one or more retaining blocks adjacent to the connector assembly. The one or more retaining blocks have a first elongated member adjacent to the back side of the cover and extending from the bottom side of the cover toward the top side of the cradle housing; a second elongated member positioned between the first elongated member and the cradle housing and extending from the bottom side of the cover toward the top side of the cradle housing, the second elongated member connected to the first elongated member at a portion of the one or more retaining blocks adjacent to the bottom side of the cover; a through hole between the first and second elongated members and extending through both the first elongated member and the second elongated member, the through hole aligned with the longitudinal axis of the at least one shaft and arranged to accept the first end or the second end of the at least one shaft between the first and second elongated members; and a gap between the first and second elongated members extending from the through hole to a distal end of second elongated member. The docking cradle assembly also includes at least one locking mechanism extending from the first elongated member, through the gap, and engaged with the second elongated member.

Other advantages and benefits of the disclosed system and methods will be apparent to one of ordinary skill with a review of the following description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which.

DETAILED DESCRIPTION

Figure 2:
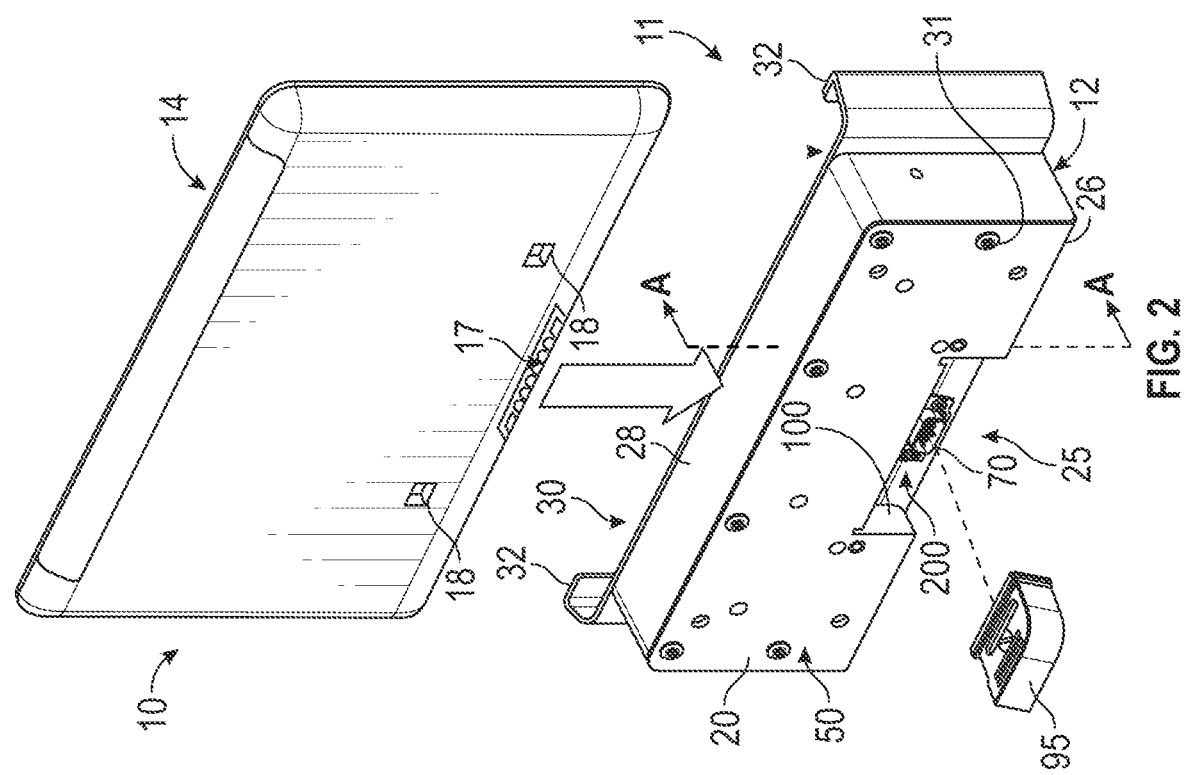
FIG. 2 is a top rear perspective view of the onboard entertainment system of FIG. 1 that includes a docking cradle assembly and a computing device, according to an embodiment.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

The present disclosure is directed to an innovative docking cradle for a computing device, for example, a handheld computing device. The computing device may be any suitable electronic device, such as a handheld controller, remote control, tablet computer, smartphone or other electronic device. For example, the computing device may be a tablet computer which is configured as a remote control for a video display unit of an onboard entertainment system (e.g., an IFE system) of a passenger vehicle. In one feature, the docking cradle is configured to be mountable to a horizontal mounting surface (e.g., a table or other horizontal surface), a vertical mounting surface (e.g., a seatback or wall), or a mounting surface having any angular orientations between the horizontal and vertical mounting surface, and while, in any mounting orientation, the docking cradle holds the computing device in substantially the same orientation for convenient use and access by a passenger of the vehicle. For instance, in any of the mounting orientations, the docking cradle may hold the computing device in a vertical orientation, a substantially vertical orientation, or at a small angle away from vertical, such that a display monitor and/or input device of the computing device is easily viewed by the passenger and accessible by the passenger while the computing device is held by the docking cradle. In this way, the passenger can conveniently use the computing device while it is installed in the docking cradle. In addition, the docking cradle has an electronic locking mechanism to lock and unlock the computing device in the cradle from a central management computer system.

Reference to a "passenger" is used herein to refer to a passenger of vehicle in which the docking cradle and computing device is installed. That is, the passenger is a person who may access and interact with the computing device while seated in a seat of the vehicle. The passenger may be able to remove the computing device from the docking cradle, use the computing device (while held by the docking cradle or otherwise), and insert the computing device back into the docking cradle. As such, the passenger only has access to the computing device and a front side of the docking cradle to which the computing device may be connected. Whereas, reference to a "user" is used herein to refer to a person or entity that installs the docking cradle and computing device onto the vehicle during manufacture. During manufacture, the user may have access to the entire docking cradle and computing device so to manipulate the docking cradle so to be installed on any particular mounting surface as described above. For example, the user may have access to a mounting surface of the docking cradle, arrange the mounting components to facilitate any mounting orientation desired, and mount the docking cradle to the surface.

Although the embodiments described herein may be used in an onboard entertainment system by mounting the docking cradle at a passenger seat, the docking cradle is not limited to such installations, but can be utilized in any suitable application, such as in schools, libraries, public spaces, etc., where it is useful to be able to dock a computing device and be capable of locking and unlocking the device in the docking cradle.

Reference throughout this specification to "an embodiment" or "an implementation" means that a particular feature, structure, or characteristic described in connection with the embodiment is included in at least one embodiment or implementation. Thus, appearances of the phrases "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The disclosure may reference horizontal and vertical directions. Generally, references to the horizontal direction are to be read as being substantially parallel with a bottom side 26 of docking cradle assembly 11 of FIG. 1. Generally, references to the vertical direction are to be read as being substantially parallel with a back side 20 of the docking cradle assembly 11 of FIG. 1.

Figure 1:
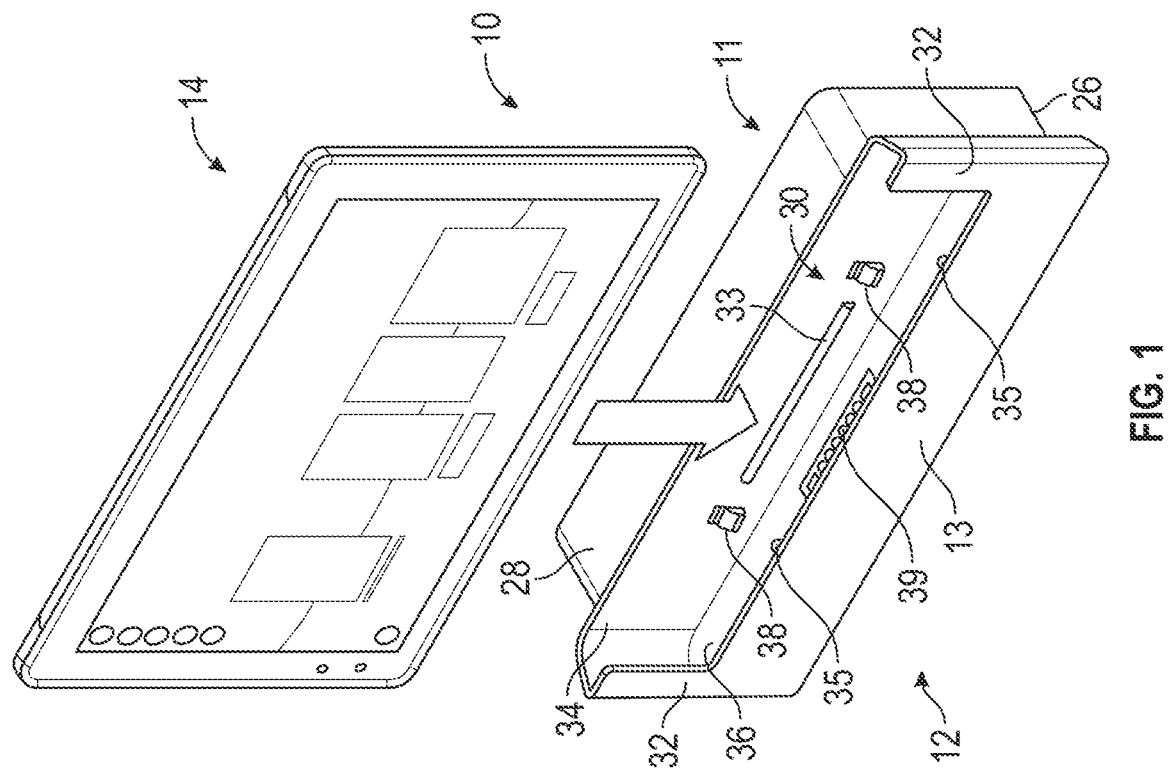
FIG. 1 is a top front, perspective view of an onboard entertainment system that includes a docking cradle assembly and a computing device, according to an embodiment.
Figure 3:
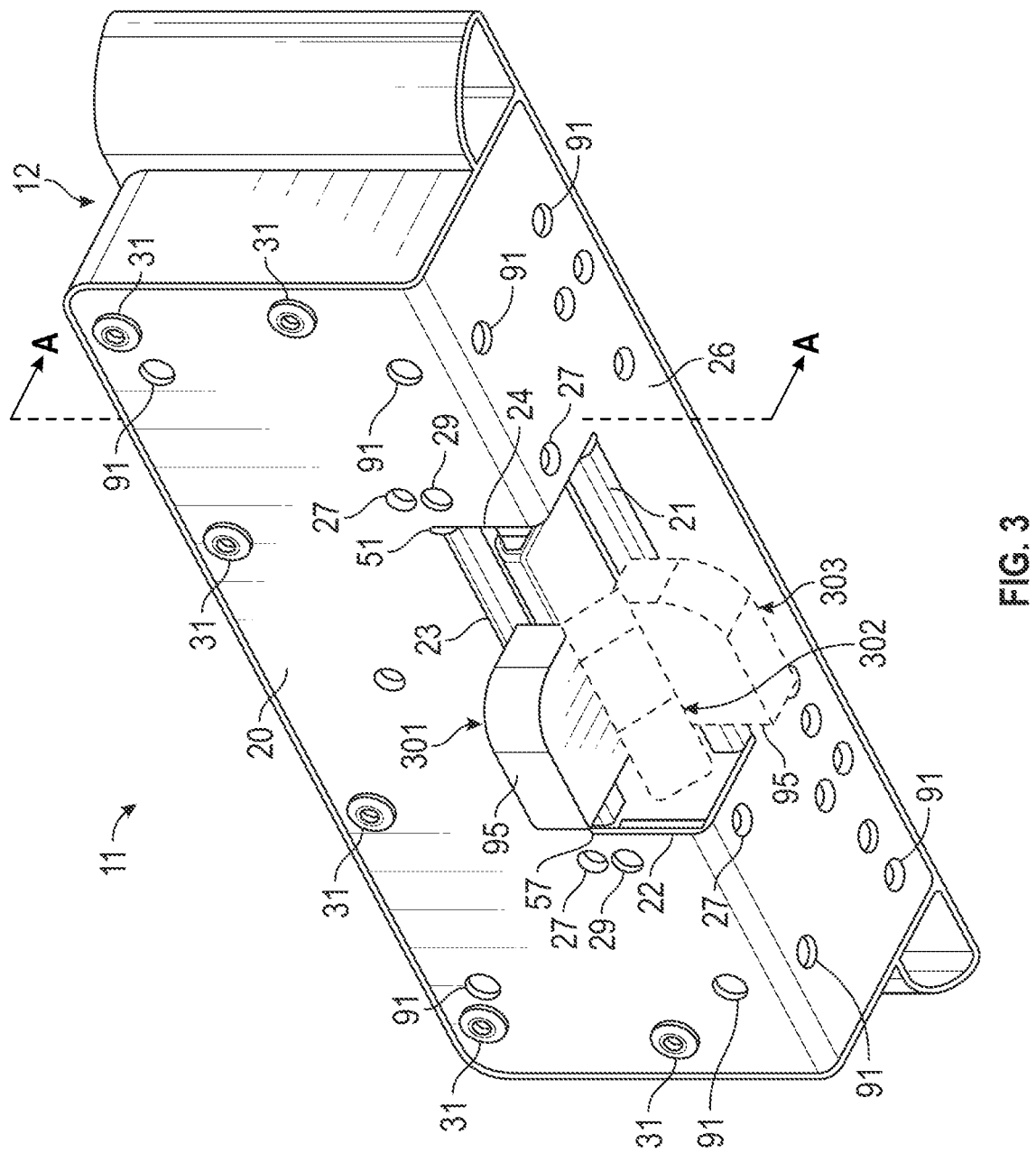
FIG. 3 is a bottom rear, perspective view of the docking cradle assembly of the onboard entertainment system of FIG. 1 with the computing device removed, according to an embodiment.

Referring to FIGS. 1-3, an embodiment of an onboard entertainment system 10 is illustrated. FIG. 1 is a front, perspective view of the onboard entertainment system 10 and FIG. 2 is a rear, perspective view of the onboard entertainment system 10. The onboard entertainment system 10 includes a docking cradle assembly 11 and a computing device 14. The docking cradle assembly 11 comprises a cradle housing 12 which forms the main structure of the docking cradle assembly 11. The cradle housing 12 has a front side 13 and top side 28, both of which a passenger can interact with and access. The cradle housing 12 also has a bottom side 26 and a back side 20, either of which may be inaccessible to the passenger dependent on the mounted orientation of the docking cradle assembly 11 selected during installation by a user.

The front side 13 has a slot 30 for slidably receiving the computing device 14 and holding the computing device 14 in a substantially vertical orientation. The slot 30 is formed by an outer wall 32 and inner wall 34, the inner wall being parallel to and spaced apart from the outer wall 32. The slot 30 is open at the top and has a slot bottom 36 upon which the computing device 14 rests when it is installed in the docking cradle assembly 11.

As illustrated in FIG. 1, the cradle housing 12 may also have locking tabs 38 controllably operated by an electronic latch assembly (not shown) contained within the cradle housing 12. The locking tabs 38 can be moved forward (locked position) and backward (unlocked position) by the electronic latch assembly. When in the forward position, the locking tabs 38 engage respective detents 18 on the back of the computing device 14 when it is installed in the slot 30 thereby locking the computing device 14 in the docking cradle assembly 11. When in the backward position, the locking tabs 38 are disengaged from the detents 18 thereby allowing the computing device 14 to be removed from the slot 30 by sliding the computing device 14 upward and out of the slot 30. Further details regarding the electronic latch assembly can be found in co-pending U.S. patent application Ser. No. 16/392,181, filed Apr. 23, 2019, the disclosure of which is incorporated herein by reference in its entirety.

The docking cradle assembly 11 may also comprise a cradle connector 39 which extends through an opening in the bottom side 26 of the cradle housing 12. The cradle connector 39 is configured to electrically connect with a computing device connector 17 on the computing device 14 to transmit power and data between the docking cradle assembly 11 and the computing device 14 (see FIGS. 14-16). The cradle connector 39 may be a spring-loaded pin connector, such as a POGO style connector. The cradle connecter 39 is operably coupled to a printed circuit board (PCB) contained within the cradle housing 12 using a flex cable or other suitable cable (not shown).

The docking cradle assembly 11 may also comprise a plurality of alignment pins disposed within the slot 30. For example, two alignment pins 35 may be positioned on the slot bottom 36 spaced apart on opposing ends of the cable connector 39 and an elongated pad 33 positioned between the locking tabs 38 on the inner wall of the cradle housing 12. The alignment pins 35 help align the computing device 14 when it is being docked into the cradle. Upon slidably receiving the computing device 14 in slot 30, the computing device 14 may rest in contact with each of pads 35 and pad 33, such that the computing device 14 is not in direct contact with the inner wall 34 or outer wall 32 and held in the substantially vertical position. A display side of computing device 14 may contact the pads 35 while a back side (see FIG. 2) of the computing device 14 may rest on pad 33. The pads 35 and 33 may be made of a nonabrasive material, such as for example but not limited to, rubber, plastic, and the like.

Figure 4:
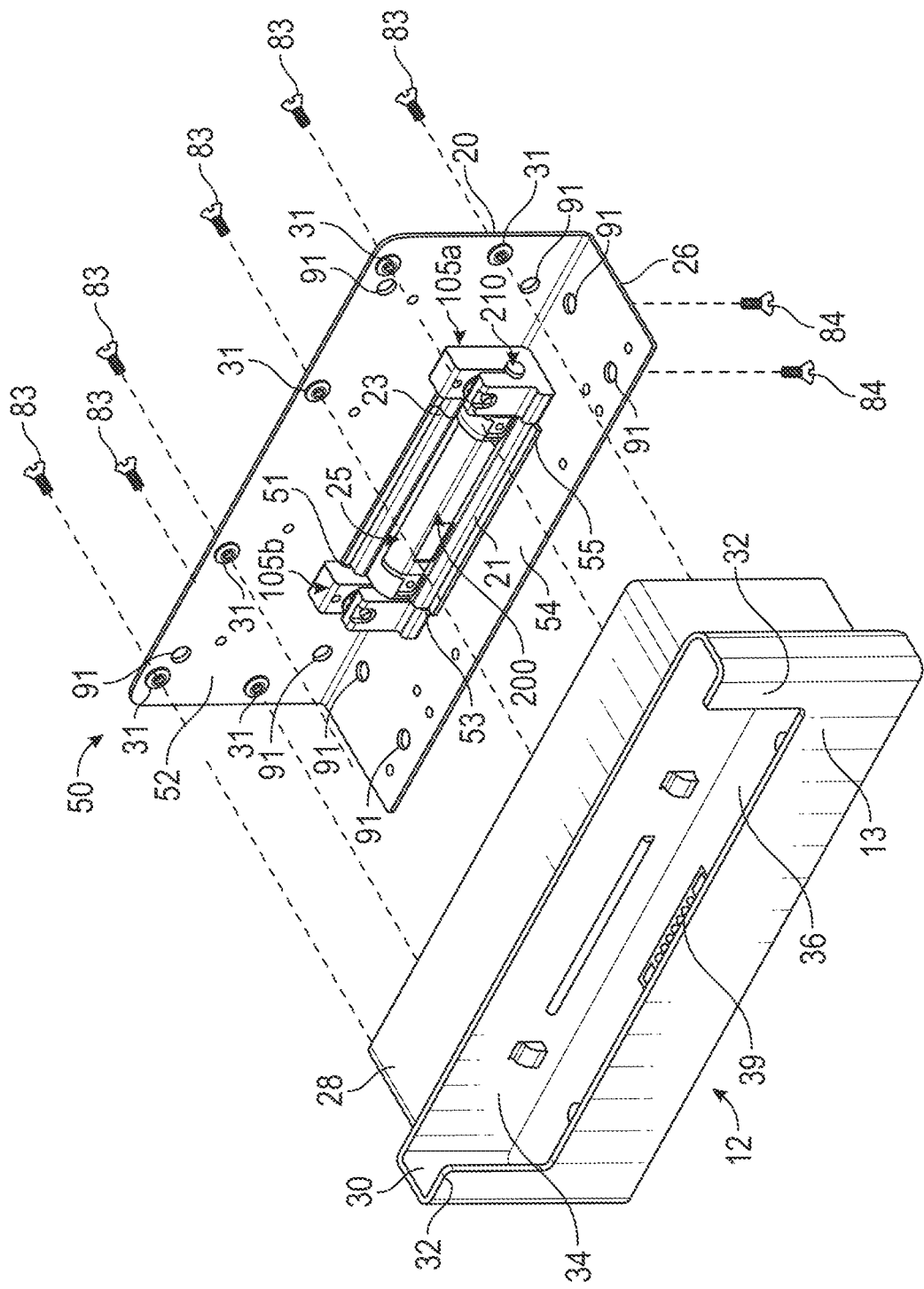
FIG. 4 is a top front, perspective, exploded view of the docking cradle assembly of the onboard entertainment system of FIG. 1 with the computing device removed, according to an embodiment.

As illustrated in FIGS. 3 and 4, the bottom side 26 and back side 20 may be an integral part forming a cover 50 over a rear opening of the cradle housing 12. The cover 50 may be removeably attached to the cradle housing 12 using fasteners 83 (e.g., screws, bolts, rivets, anchors, inserts, etc.) via attachment holes 31. The cover 50 also comprises mounting holes 91 arranged to receive mounting fasteners 84 for mounting the docking cradle assembly 11 to a mounting surface. Mounting fasteners 84 may be the same or different types of fastener as the fasteners 83. The docking cradle assembly 11 maybe mounted to a vertical mounting surface via the mounting holes 91 on the back side 20 or to a horizontal mounting surface via mounting holes 91 on the bottom side 26. Cover 50 includes a vertical surface 52 opposite the back side 20 and a horizontal surface 54 opposite the bottom side 26.

Cover 50 has a horizontal flange 23 attached to the back side 20 and extending horizontally inward from the vertical surface 52 toward the front side 13 of the cradle housing 12. Similarly, a vertical flange 21 is attached to the bottom side 26 and extending vertically from the horizontal surface 54 toward the top side 28 of the cradle housing 12. Flanges 21 and 23 may be an integral part of cover 50, for example, the cover 50 may be bent to form flanges 21 and 23. In some embodiments, the cover 50 may be a malleable metal or alloy that permits bending to form flanges 21 and 23.

Cover 50 also has "L" shaped edges 22 and 24 spaced apart from each other on opposing ends of the flanges 21 and 23. That is, edge 22 is connected to flange 23 at end 57 and flange 21 at end 55, while edge 24 is connected to flange 23 at end 51 and flange 21 at end 53. Edges 22 and 24 and flanges 21 and 23 provide an opening 25 within cover 50 having a box like shape (more clearly illustrated in the partial exploded view shown in FIG. 5). Adjacent to each edge 22 and 24 and positioned along vertical surface 52 and horizontal surface 54 are two locking mechanisms 105a and 105b (collectively referred to as "locking mechanism 105"). Each locking mechanism 105 is attached to the back side 20 and bottom side 26 using fasteners (e.g., fasteners 85 shown in FIG. 7) via attachment holes 27. Each locking mechanism 105 may be accessed through adjustment hole 29 of the back side 20 during installation of the docking cradle assembly 11 by a user. Interaction with each locking mechanism 105 changes the docking cradle assembly 11 from an unlocked state to a locked state.

The docking cradle assembly 11 also includes a connector assembly 200 disposed within opening 25. The connector assembly 200 has a computer system connector 70 for electrically connecting the docking cradle assembly 11 to a computer management system (e.g., computer management system 505 of FIG. 16). The computer system connector 70 may receive a reciprocal connector 95 for transferring power and data from the computer management system 505 and transmit the power and data between the docking cradle assembly 11 and the computing device 14. For example, the computer system connector 70 may be a male pin connector and the reciprocal connector 95 may be a female receptacle connector that mates with and receives the male pin connector. Example connectors may be, but are not to, VGA connectors, DVI connectors, HDMI, USB, D-Terminal, DisplayPort, and the like. While embodiments herein are illustrated with a single computer system connector 70, it will be understood that the connector assembly 200 may comprise one or more connectors of the same or different connector types so to accommodate differing applications (e.g., data, power, or both) or different transmission standards (e.g., DVI, D-Terminal, HDMI, etc.).

The connector assembly 200 is positioned between the locking mechanisms 105 and flanges 21 and 23 such that the connector assembly 200 is held within the opening 25. The flanges 21 and 23 extend a length that at least partially overlaps with the connector assembly 200, such that the combination of locking mechanisms 105 and flanges 21 and 23 may hold the connector assembly 200 within the opening 25. That is, the flange 21 and locking mechanisms 105 restrain the connector assembly 200 from horizontal lateral movement and flange 23 restrains the connector assembly from vertical lateral movement. The locking mechanisms 105, while in an unlocked state, hold the connector assembly 200 within opening 25 while permitting rotational movement about a longitudinal axis of the connector assembly 200.

As illustrated in FIG. 4, while in a locked state the locking mechanisms 105 are configured to lock the connector assembly 200 at a given position, and, while in an unlocked state, the locking mechanisms 105 permit the connector assembly 200 to be rotated about its longitudinal axis into any of a plurality of orientations. For example, in the unlocked state the connector assembly 200 may be rotatable about its longitudinal axis such that the computer system connector 70 can be rotated from a horizontal position 301 to a vertical position 303 and any angular position 302 there between (illustratively shown as an angular position 302 being rotated approximately 45 degrees from the horizontal position 301). The horizontal position 301 may be referred to as a zero degree of rotation position such that the computer system connector 70 is able to accept the reciprocal connector 95 along a direction parallel with the bottom side 26. The vertical position 303 may be referred to as a 90 degree rotation from the horizontal position such that the computer system connector 70 is able to receive the reciprocal connector 95 along a direction parallel with the back side 20. While the angular position 302 is illustratively shown as approximately 45 degrees, the angled position may be any angle between the horizontal position 301 and the vertical position 303, for example but not limited to, 1, 10, 25, 30, 45, 60, 89, etc. degrees of rotation from the horizontal. In some embodiments, the flanges 21 and 23 may be configured to prevent over-rotation of the computer system connector 70 (e.g., beyond the horizontal or vertical positions). For example, in the horizontal position the flange 23 may be in contact with a surface of the connector assembly 200 and/or a side of the computer system connector 70 such that rotation beyond the horizontal position is not possible. Similarly, the flange 21 may contact the connector assembly 200 and/or another side of the computer system connector 70 in the vertical position. Once the connector assembly 200 is positioned as desired, the locking mechanisms 105 may be operated to change docking cradle assembly 11 to the locked position and lock the connector assembly 200 at the desired position.

Figure 5:
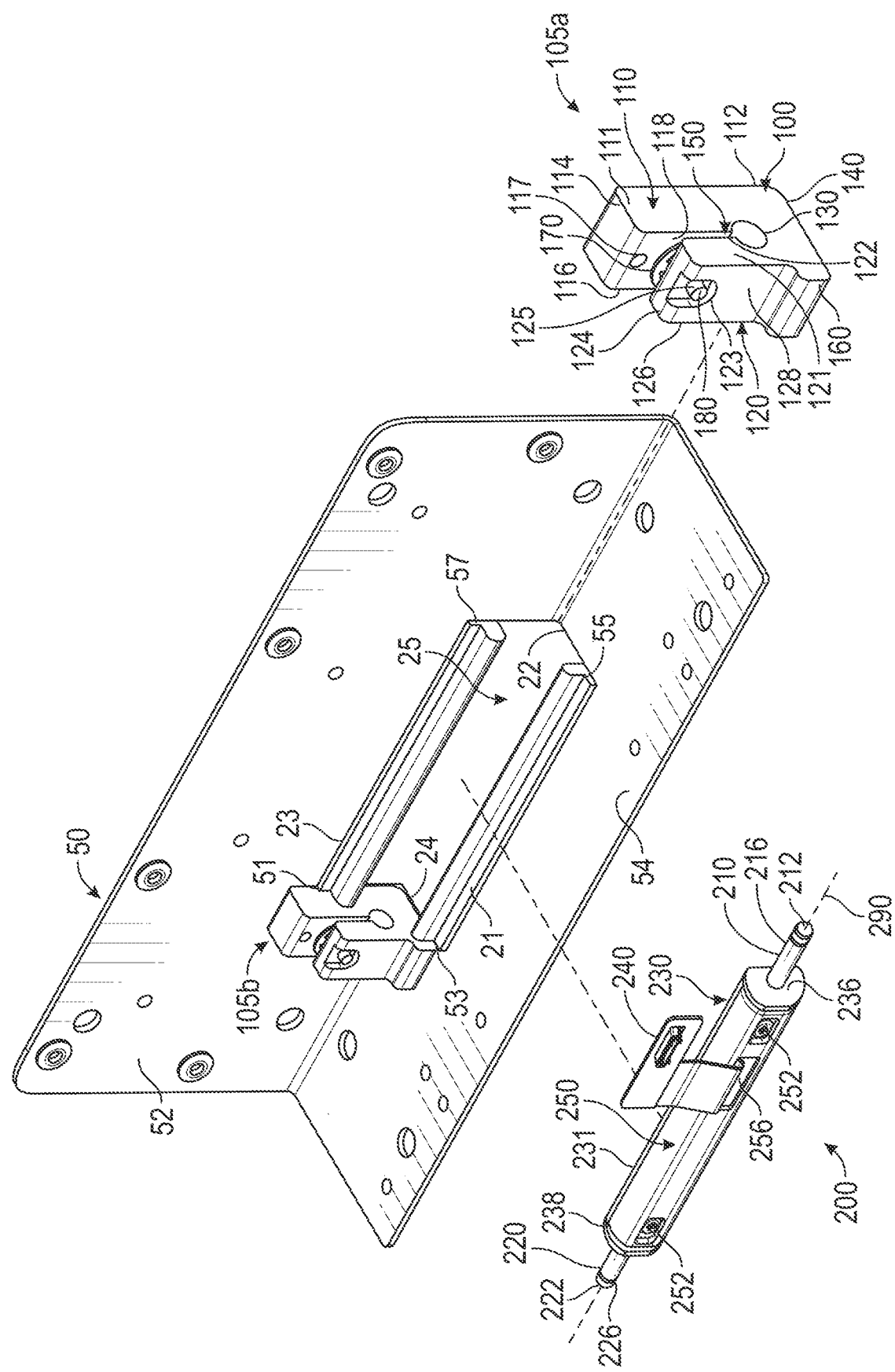
FIG. 5 is a front, perspective, partial exploded view of the docking cradle assembly of FIG. 3 with the cradle housing removed, according to an embodiment.
Figure 6:
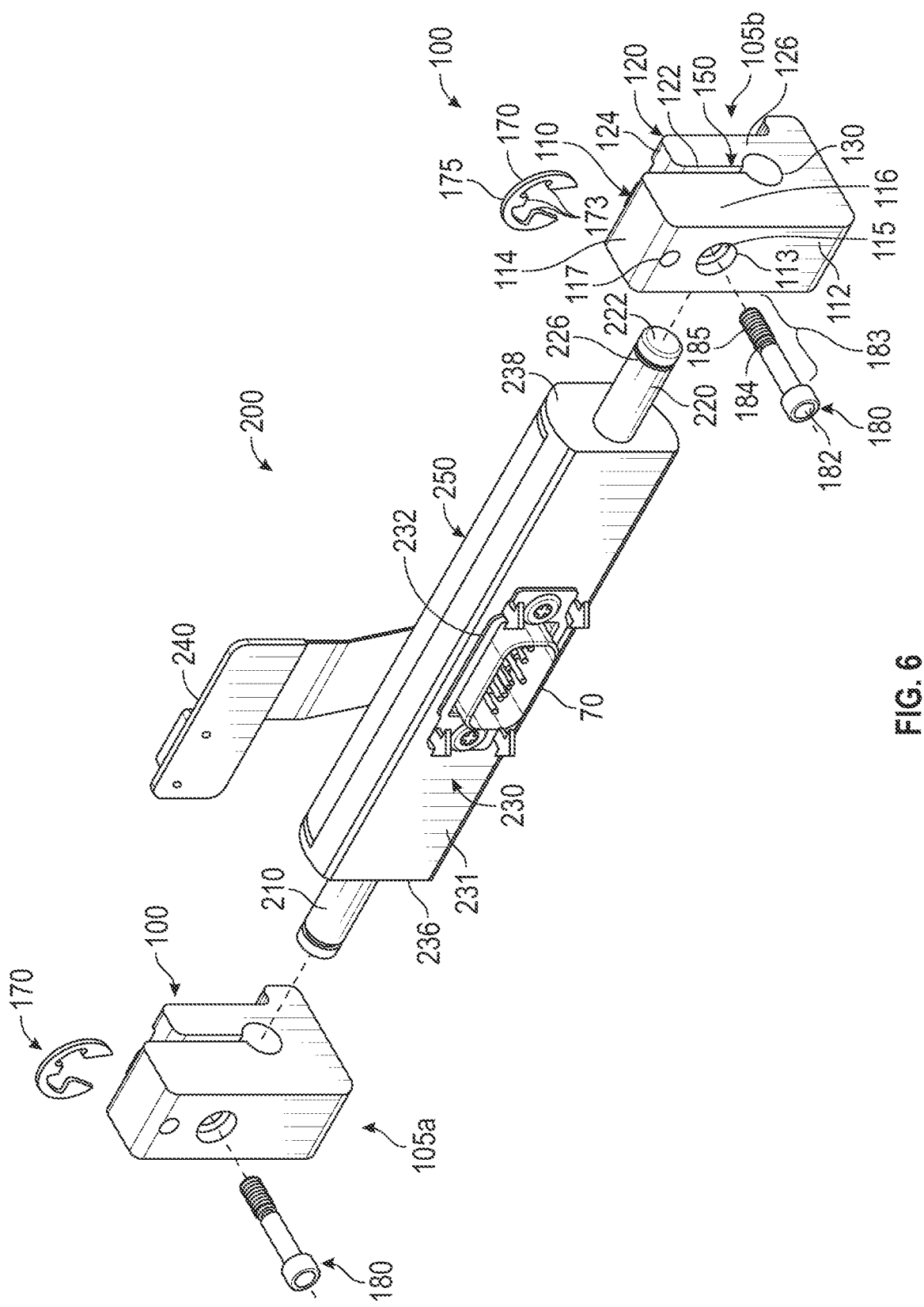
FIG. 6 is a top rear, perspective, exploded view of the docking cradle assembly with the cradle housing and cover removed, according to one embodiment.

Referring to FIGS. 5 and 6, the connector assembly 200 includes a connector housing 250 removeably attached to a housing seat 230 using fasteners 252. The housing seat 230 comprises a first end 236 and a second end 238 enclosing a cavity between the connector housing 250 and housing seat 230. Extending from ends 236 and 238, away from connector housing 250, and along a longitudinal axis 290 are shafts 210 and 220, respectively. Shafts 210 and 220 each comprise an end 212 and 222 and a bushing 216 and 226 (or bearing surface), respectively. In some embodiments, shafts 210 and 220 are a single shaft feature that extends from end 212 to 222. In another embodiment, alone or in combination, shafts 210 and 220 are integral parts of housing seat 230.

The housing seat 230 includes an opening 232 on rear side 231 through which at least a portion of the computer system connector 70 protrudes. The remaining portion of the computer system connector 70 is housed within connector housing 250. The computer system connector 70 is operably coupled to a controller (e.g., a processor or logic control circuit 312 of FIG. 14) on a printed circuit board (PCB) (not shown) housed in the cradle housing 12 for transferring data between the docking cradle assembly 11 and a computer management system. The computer system connector 70 may also couple to a power transfer interface for transferring power from an external power supply. A flex cable 240 extends from an opening 256 of the connector housing 250 and electrically connects the computer system connector 70 to the PCB and to the cradle connector 39. In some embodiments, the PCB (not shown) has a wireless communication module 310 configured to wirelessly communicate with the computing device 14, such as when the computing device 14 is removed from the docking cradle assembly 11. The computing device 14 has a compatible wireless communication module 404 (see FIG. 15) for wirelessly communicating with the wireless communication module 310. The wireless communication modules 310 and 404 may be any suitable wireless communication modules, such as WLAN, wireless USB, WiMAX WiFi, Bluetooth, cellular phone communication, etc.

Figure 7:
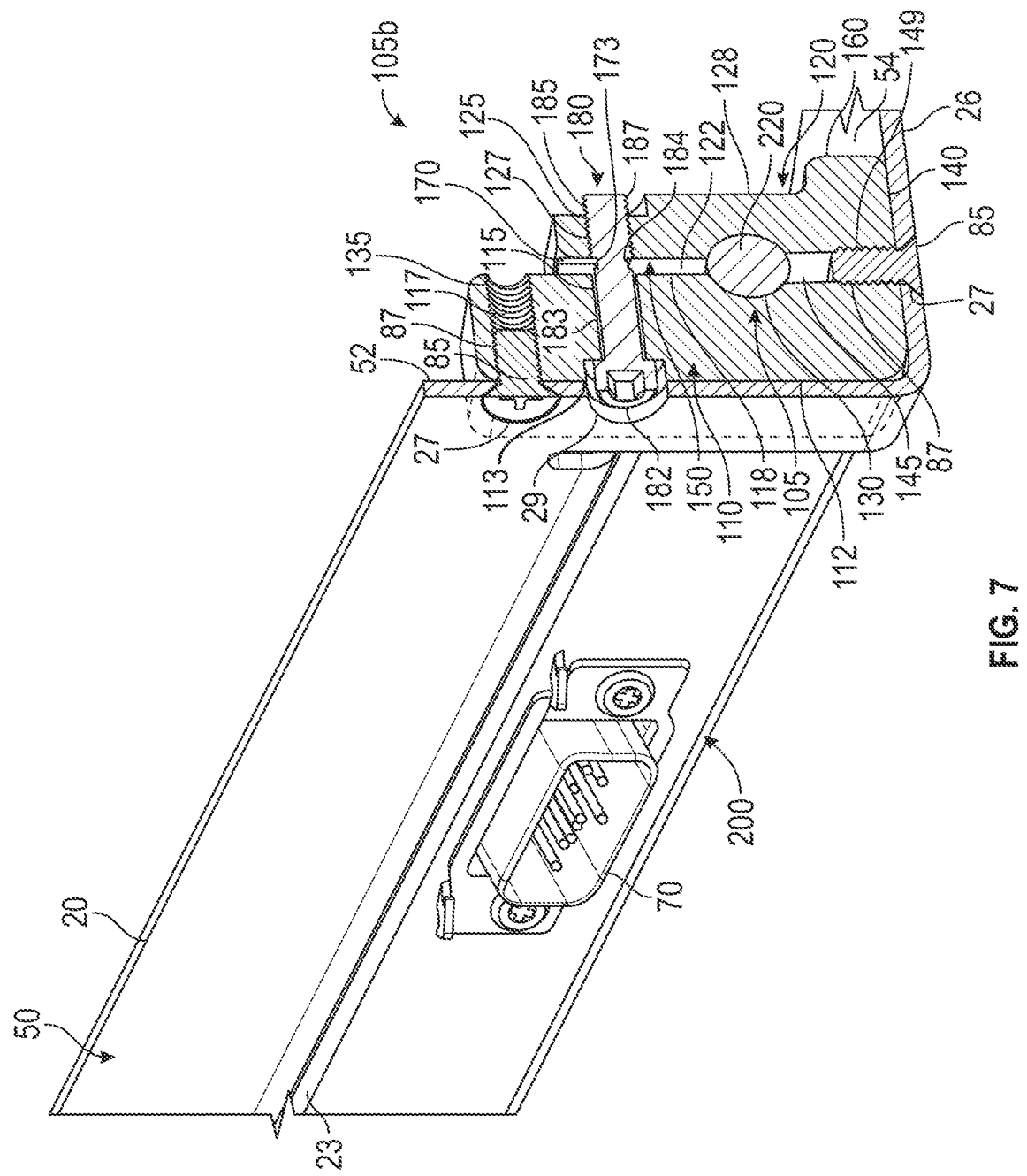
FIG. 7 is a cross sectional of a top rear, perspective view of the onboard entertainment system taken along the plane AA of FIG. 2, according to an embodiment.

Referring to FIGS. 5-7, a first locking mechanism 105a may be disposed adjacent to edge 22 and a second locking mechanism 105a may be disposed adjacent to edge 24. Each locking mechanism 105 may comprise a retaining block 100 having a bottom surface 140, a through hole 130, a first elongated member 110, and a second elongated member 120. The second elongated member 120 is connect to the first elongated member 110 at a portion of the retaining block, for example, at a portion adjacent to the bottom side 26 that extends to the through hole 130. Each locking mechanisms 105 may also comprise a locking member 180 extending from the first elongated member 110 to the second elongated member 120. The through hole 130 may have a circumference arranged to receive either shaft 210 or 220 of the connector assembly. That is, the through hole 130 of retaining block 100 disposed adjacent to edge 24 receives shaft 220, while the through hole 130 of a retaining block 100 disposed adjacent to edge 22 receives shaft 210. In some embodiments, the components 216 and 226 of shafts 210 and 220 (e.g., bushing or bearing surfaces) may comprise an aluminum material and the retaining blocks 100 may comprise stainless steel. This combination of materials and features may be arranged to create a relatively low friction interface for shafts 210 or 220 while rotating within through holes 130. In the illustrated embodiment, the retaining blocks 100 also each include an optional protrusion 160 extending from the second elongated member 120 away from the first elongated member 110.

The first elongated member 110 of each locking mechanism 105 comprises a rear facing surface 112, a front facing surface 118, top surface 114, and side surface 116 and 111. The rear facing surface 112 may be positioned parallel and adjacent to the vertical surface 52 and the bottom surface 140 may be parallel to and adjacent to the horizontal surface 54. In some embodiments, each retaining block 100 may be in contact with at least one of the vertical surface 52 and/or the horizontal surface 54, while in other embodiments there may be an intervening material there between.

The first elongated member 110 also includes an attachment hole 117 positioned adjacent to the top surface 114 extending from the rear facing surface 112 toward the front facing surface 118. The attachment hole 117 of each locking mechanism 105 may be aligned with a corresponding attachment hole 27 of the cover 50 and may be arranged to accept fastener 85 there through. For example, referring to the cross sectional view of FIG. 7 taken along the plane AA of FIG. 1 and FIG. 3, the attachment hole 117 may include internal threads 135 arranged to accept external threads 87 of a screw implemented as fastener 85 to attach each retaining block 100 to cover 50. In some embodiments, the attachment hole 117 extends through elongated member 110. The first elongated member 110 also comprises a bore 113 to locking hole 115 arranged to accept the locking member 180.

Each second elongated member 120 comprises a rear facing surface 122, a front facing surface 128, top surface 124, and side surface 126 and 121. The rear facing surface 122 is adjacent to the front facing surface 118 of the first elongated member having a gap 150 there between. As illustrated, the first elongated member 110 may extend further from the horizontal surface 54 than the second elongated member 120. In another embodiment, the top surfaces 124 and 114 may be aligned or the top surface 124 may be above the top surface 114.

The second elongated member 120 also includes a locking hole 125 aligned with the locking hole 115 of the first elongated member 110 and arranged to accept locking member 180, such that the locking holes 115 and 125 share a common longitudinal axis. For example, in the illustrated embodiment, locking member 180 is a screw having a head end 182 and locking shaft 183. The shaft may include an annular recess 184 about the circumference of the locking shaft 183 and a threaded portion or end 185 having external threads 187. The locking hole 125 may comprise internal threads 127 arranged to interface with the threaded portion

185. Head 182 is positioned within bore 113 and the locking holes 115 and 125 receive the locking shaft 183, such that the annular recess 184 is positioned within the gap 150 between the elongated members 110 and 120. In this arrangement, at least a portion of the thread portion 185 is positioned within locking hole 125. In other embodiments, the locking member may extend through elongated member 120, for example, from a bore 123 on the front facing surface 128.

Each locking mechanism 105 may include an attachment hole 145 on the bottom surface 140. The attachment hole 145 of each locking mechanism 105 may be aligned with a corresponding attachment hole 27 of the cover 50 and may be arranged to accept fastener 85 there through. For example, the attachment hole 145 may include internal threads 149 arranged to accept external threads 87 of a screw implemented as fastener 85 to attach each retaining block 100 to cover 50. In some embodiments, the attachment hole 145 extends from the bottom surface 140 to the through hole 130.

Each locking mechanism 105 may also comprise a retaining clip or ring 170 that engages with the locking member 180 within the gap 150 via the annular recess 184. The retaining clip 170 may be, for example but not limited to, an E-style ring, a C-style or crescent ring, a poodle ring, a push on retaining ring, and the like. In the illustrated embodiment, the retaining clip 170 is an E-style or side mount external retaining ring having a body 175 and teeth 173. The teeth 173 are configured to interface with the annular recess 184 of the locking member 180 such that the body 175 at least partially surrounding the locking shaft 183. The retaining clip 170 may be configured to restrain the locking member 180 within the locking holes 115 and 125.

In operation, a user may install the docking cradle assembly 11 in accordance with the embodiments herein on a mounting surface. Once mounted or prior thereto, the user may adjust the position of computer system connector 70. For example, the user may manually move the computer system connector 70 into a desired position. Bushing 216 and 226 of each shaft 210 and 220 permit rotational movement about the longitudinal axis with reduced and/or minimal friction between through holes 130 and corresponding shafts 210 and 220. The rotational movement may be restrained by the flanges 21 and 23 as described above.

To lock the computer system connector 70 into the desired position, the user may interact with the locking member 180 of each locking mechanism 105 to cause the respective locking mechanism 105 to change to the locked position. For example, turning a screw implemented as the locking member 180 in a tightening direction about its longitudinal axis (e.g., clockwise operation for right-hand direction thread) will cause the threaded portion 185 of locking member 180 to move deeper into locking hole 125. Since the first elongated member 110 is stationary and attached to the cover 50, such operation of the locking member 180 pulls the top surface 124 of the elongated member 120 toward the elongated member 110 and reduces the gap 150 between the elongated members 110 and 120. Reducing the gap 150 causes a corresponding reduction or variation in the diameter of the through hole 130 and clamping down on the shaft therein (e.g., shaft 210 or 220 depending on the arrangement of the retraining block 100).

To readjust the position of computer system connector 70, the locking mechanism 105 can be changed to an unlocked state, for example, by turning the locking member 180 in the opposite direct. This in turn will release the clamping of the shaft and allow rotational movement of the computer system connector.

FIGS. 8-13 illustrate the docking cradle assembly 11 for holding the computing device 14 mounted on surfaces 90*a-c* (collectively "surface 90") in a plurality of mounting positions such that the computer system connector 70 is orientated based on the orientation of surface 90.

Figure 8:
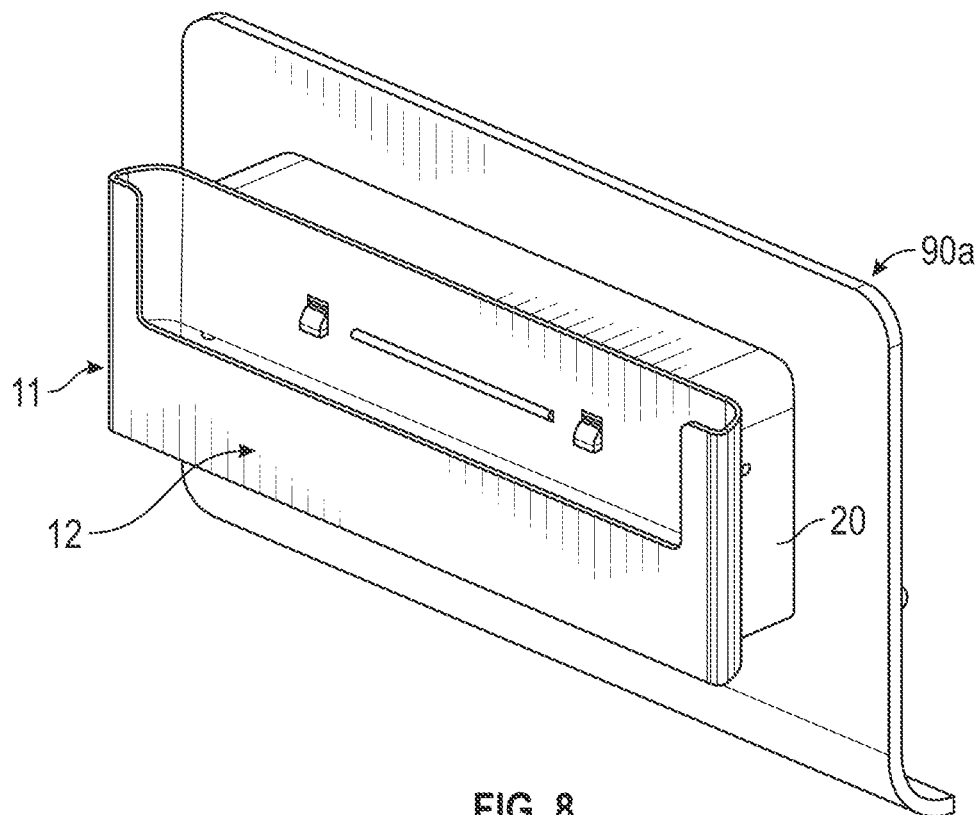
FIG. 8 is a front, perspective view of the docking cradle assembly of FIG. 1, with the computing device removed, in a vertical mount configuration, according to an embodiment.
Figure 9:
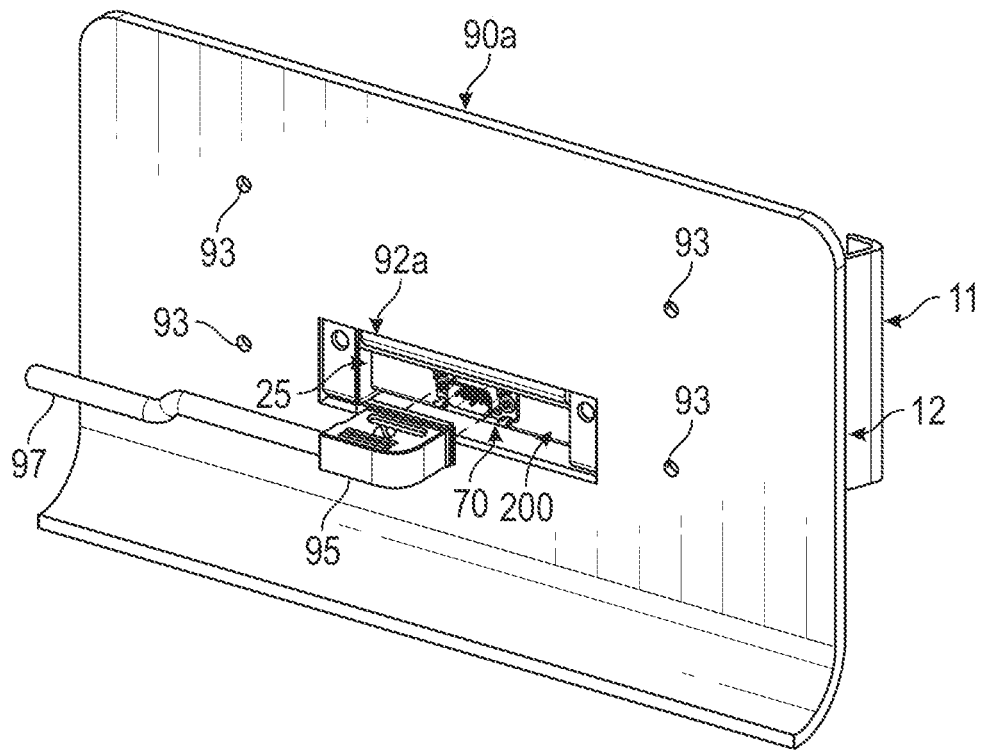
FIG. 9 is a rear, perspective view of the docking cradle assembly of FIG. 1, with the computing device removed, in a vertical mount configuration, according to an embodiment.

As shown in FIGS. 8 and 9, in a first configuration, referred to as a vertical mount configuration (or vertical mount), the docking cradle assembly 11 is configured to be mounted to a substantially vertical mounting surface 90*a*, such as a seatback or wall, with the back side 20 of the docking cradle assembly 11 attached to the mounting surface 90*a* using mounting fasteners via through holes 93 and mounting holes 91 of the docking cradle assembly 11. The mounting surface 90*a* has an opening 92*a* aligned with opening 25 through which the reciprocal connector 95 can be coupled to computer system connector 70. As the docking cradle assembly 11 is in the vertical mount configuration, the computer system connector 70 may be in the horizontal position to allow ease of connection with the reciprocal connector 95.

Figure 10:
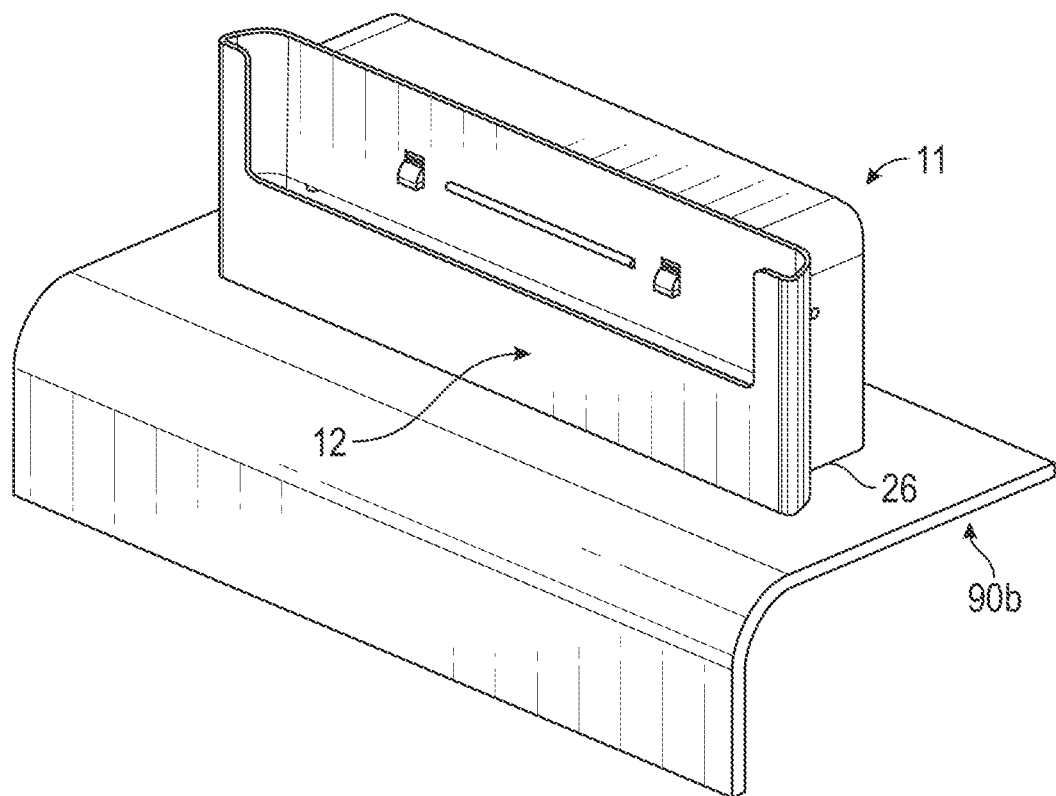
FIG. 10 is a front, perspective view of the docking cradle assembly of FIG. 1, with the computing device removed, in a horizontal mount configuration, according to an embodiment.
Figure 11:
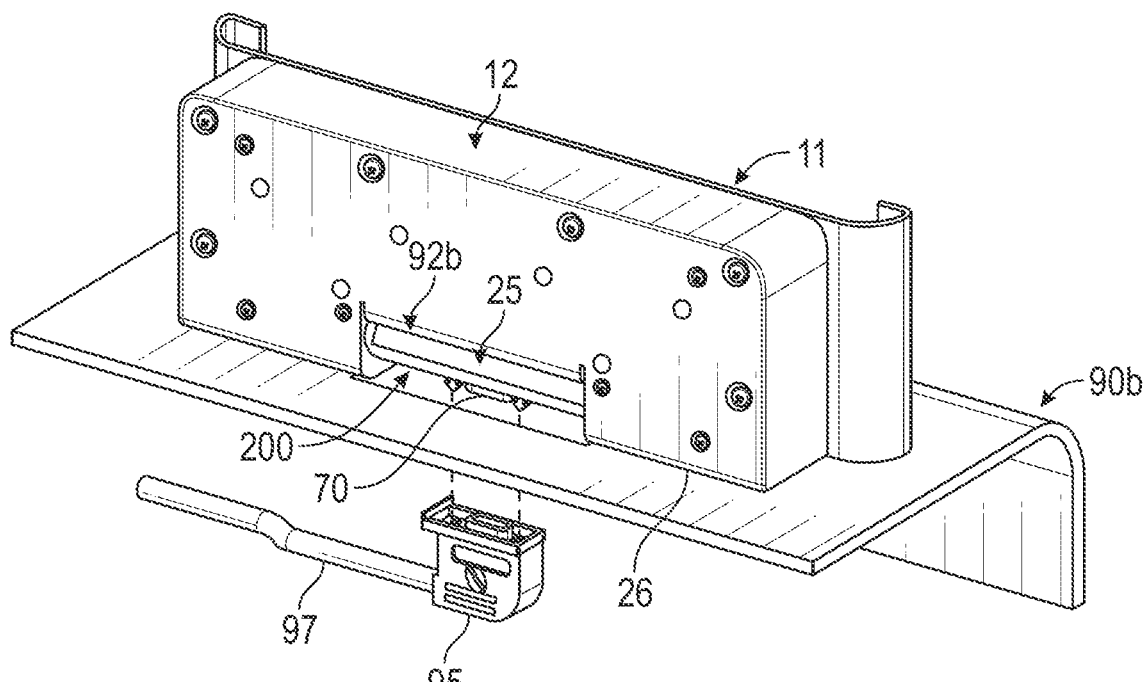
FIG. 11 is a rear, perspective view of the docking cradle assembly of FIG. 1, with the computing device removed, in a horizontal mount configuration, according to an embodiment.

As shown in FIGS. 10 and 11, in a second configuration, referred to as horizontal mount configuration (or horizontal mount), the docking cradle assembly 11 is configured to be mounted to a substantially horizontal mounting surface 90*b*, such as a table, arm rest, or the like, with the bottom side 26 of the docking cradle assembly 11 attached to the mounting surface 90*b* using mounting fasteners via through holes and mounting holes 91 on the bottom side 26 of the docking cradle assembly 11. The mounting surface 90*b* has an opening 92*b* aligned with opening 25 through which the reciprocal connector 95 can be coupled to computer system connector 70. As the docking cradle assembly 11 is in the horizontal mount configuration, the computer system connector 70 may be in the vertical position to allow ease of connection with the reciprocal connector 95.

Figure 12:
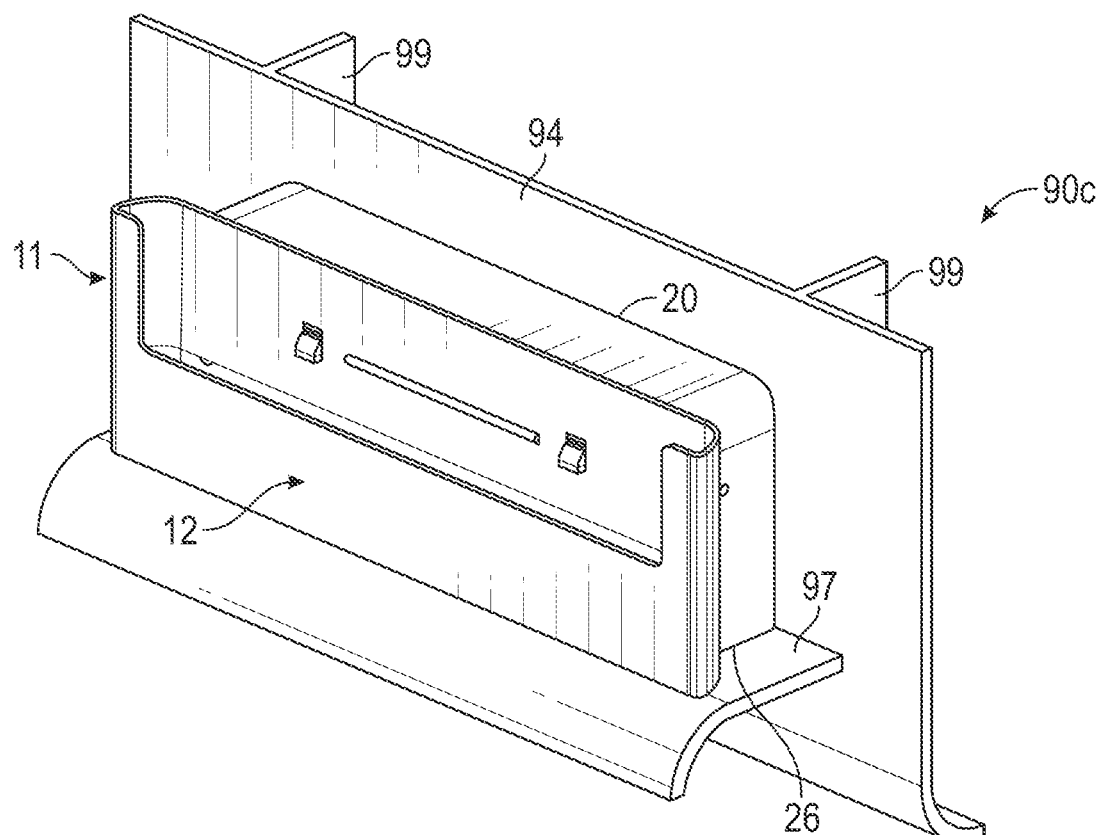
FIG. 12 is a front, perspective view of the docking cradle assembly of FIG. 1, with the computing device removed, in an angled mount configuration, according to an embodiment.
Figure 13:
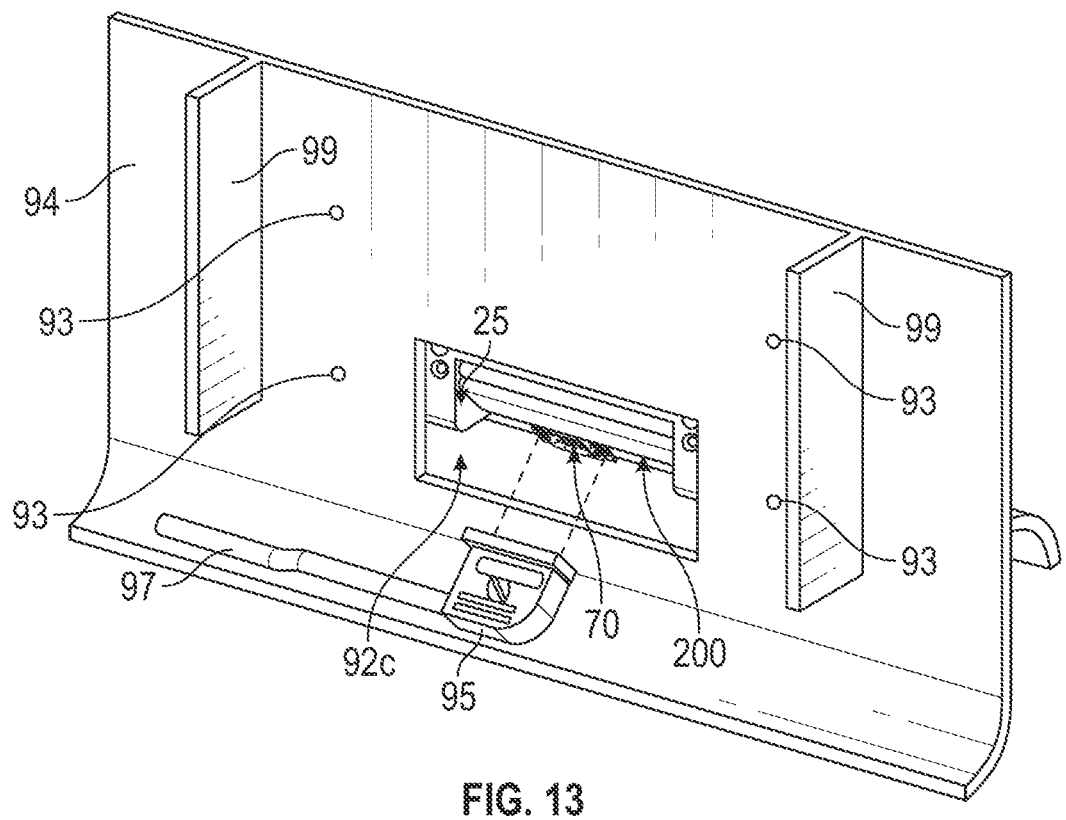
FIG. 13 is a rear, perspective, exploded view of the docking cradle assembly of FIG. 1, with the computing device removed, in an angled mount configuration, according to an embodiment.

As shown in FIGS. 12 and 13, in a third configuration, referred to as angled mount configuration (or horizontal and vertical mount), the docking cradle assembly 11 is configured to be mounted to a mounting surface 90*c*, such as a table or ridge positioned against a wall, with the back side 20 of the docking cradle assembly 11 mounted to a substantially vertical mounting surface 94 and the bottom side 26 of the docking cradle assembly 11 attached to the a substantially horizontal surface 97 using mounting fasteners via through holes 93 and mounting holes 91 of the docking cradle assembly 11. The mounting surface 90*c* has an opening 92*c* aligned with opening 25 through which the reciprocal connector 95 can be coupled to computer system connector 70. As the docking cradle assembly 11 is in the horizontal and vertical mount configuration and there are two obstructions 99, the reciprocal connector 95 may not be easily coupled to the computer system connector 70 in either the vertical or horizontal positions. Thus, the computer system connector 70 is rotated to an angled position (e.g., 45 degrees in this example) such that the reciprocal connector 95 can be coupled around the obstructions 99. While the example herein is provided for 45 degrees from the horizontal, other angled positions are possible as described herein.

In this way, embodiments herein provide flexibility for installation of docking cradle assembly 11 onto any mounting surface configuration. For example, the docking cradle assembly 11 can be mounted onto vertical and/or horizontal surfaces by providing attachment points (e.g., mounting holes 91) on each of the back side 20 and bottom side 26, and obstructions and tight installation spaces can be navigated allowing the computer system connector 70 to rotate to accommodate to any desired mounting configuration. Whereas conventional systems are required to be installed in one orientation, either on a horizontal or on a vertical surface. Often, these installation locations are restricted, especially in terms of routing of the harness wiring or space available for accessing connectors.

While embodiments described herein include two locking mechanisms 105 coupled to the connector assembly 200 via shafts 210 and 220, other implementations are possible. For example, the docking cradle assembly 11 may comprise a single locking mechanism 105 coupled to either shaft 210 or 220 with a bearing, bushing or other rotatable element attached to the other shaft 220 or 210. The bearing may be inserted into a support structure such that, when the single locking mechanism 105 is in the unlocked state, the connector assembly 200 may be rotated into a desired position. Then the locking mechanism 105 may be manipulated into the locked state as described above. In this embodiment, the user needs only interact with a single locking mechanism 105 instead of multiple locking mechanisms.

Figure 14:
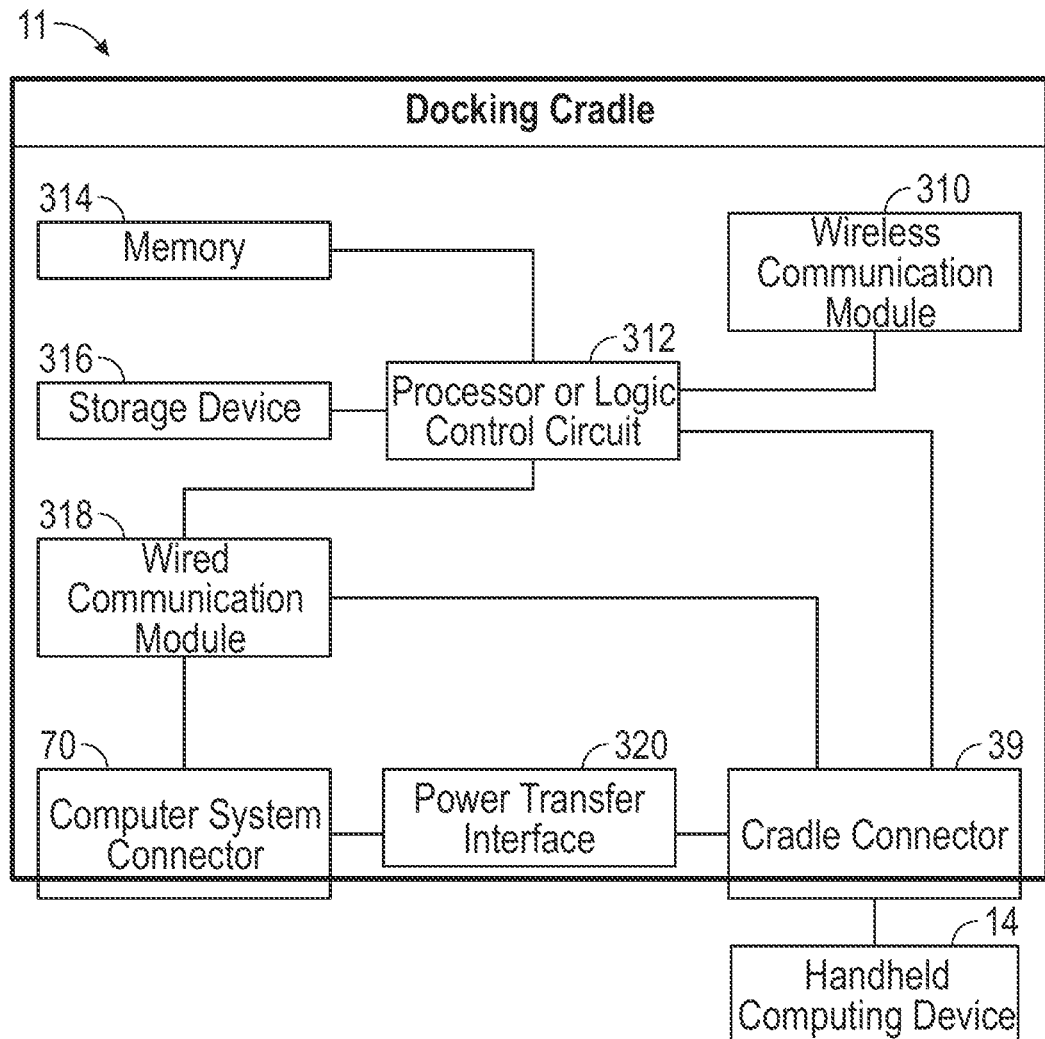
FIG. 14 is a block schematic diagram of the docking cradle assembly of FIG. 1, according to several embodiments.

Referring to FIG. 14, a block schematic diagram of the docking cradle assembly 11 is illustrated. The docking cradle assembly 11 includes a processor or logic control circuit 312. The processor or logic control circuit 312 is configured to execute computer program instructions or logic to perform the functions described herein for the docking cradle assembly 11. The docking cradle assembly 11 includes memory 314, a wired communication module 318 (e.g., Ethernet adapter, or other suitable network adapter), a wireless communication module 310, a storage device 316, and a power transfer interface 320. Each of these components may be disposed and operably interconnected on the PCB.

Figure 15:
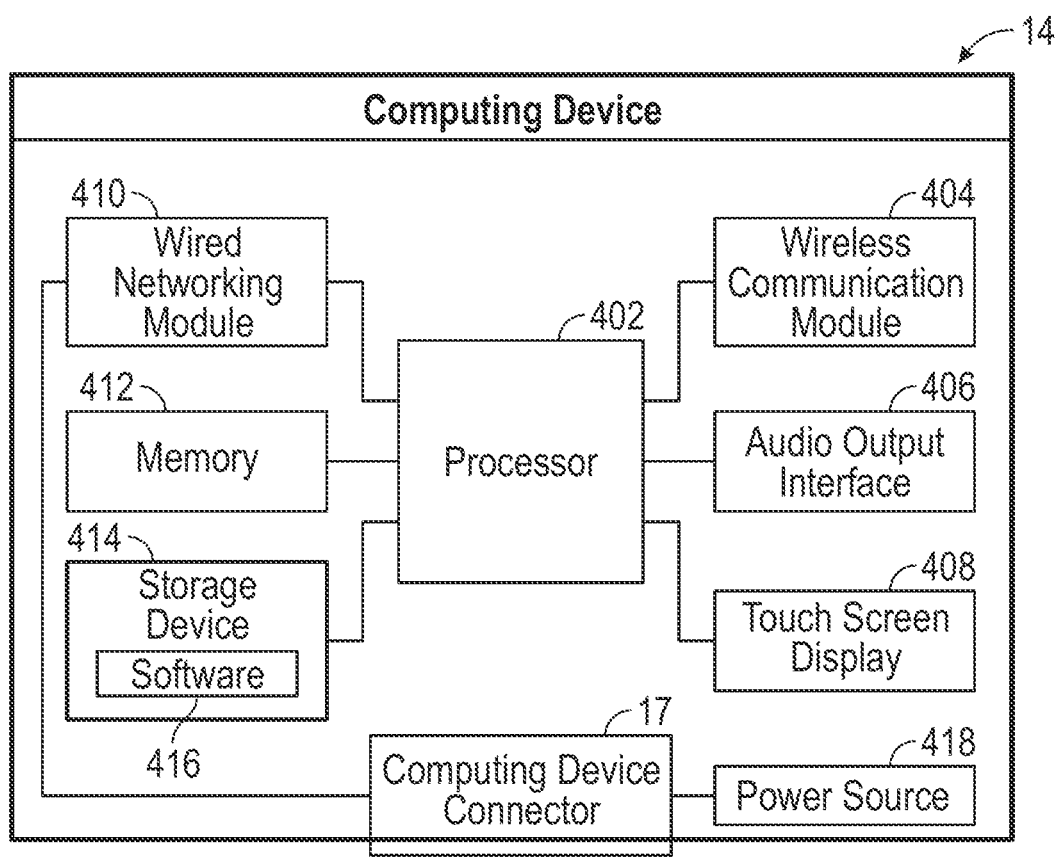
FIG. 15 is a block schematic diagram of a computing device for use with the docking cradle of FIG. 1, according to several embodiments.

Turning to FIG. 15, a block schematic diagram of an example computing device 14 is illustrated. The computing device 14 includes a processor 402 configured to execute computer program instructions to perform the functions described herein for the computing device 14, including without limitation, functioning as a controller for: a display system of an onboard entertainment system 10, seat functions, and onboard communication functions, a secondary display monitor for an entertainment system, etc. The computing device 14 further includes a power source 418 (e.g., a battery or other device for storing and supplying power to the computing device 14) for receiving power from the docking cradle assembly 11 via the cradle connector 39, a wired networking interface 410 (e.g., Ethernet adapter or other suitable network adapter), memory 412, a storage device 414, system software 416 for operating the computing device 14, a wireless communication module 404 (as described herein), an audio output interface 406 and a touch screen display 408.

Figure 16:
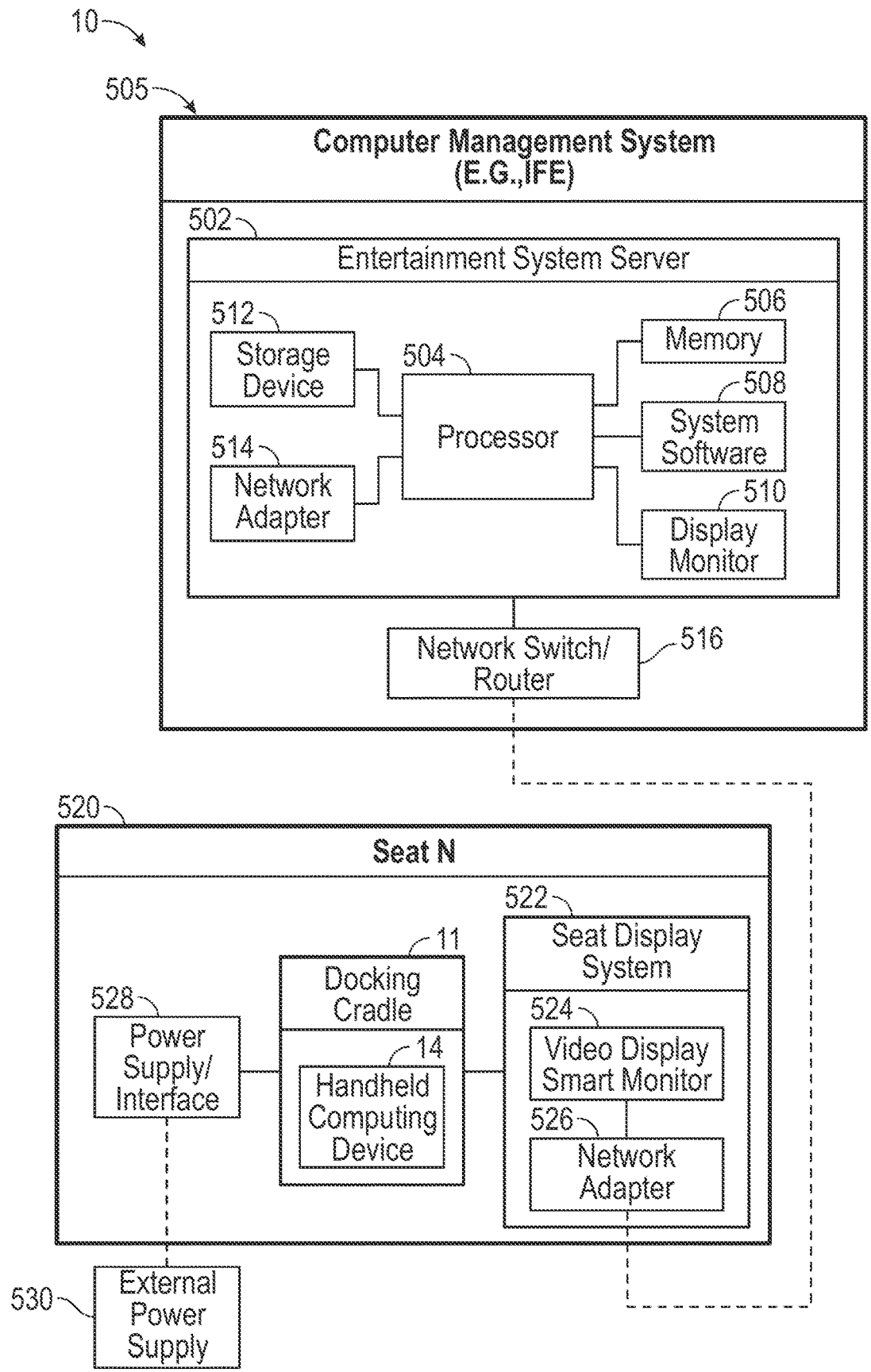
FIG. 16 is a block schematic diagram of the onboard entertainment system of FIG. 1 that includes the docking cradle and handheld computing device, according to several embodiments.

Referring now to FIG. 16, a block schematic diagram of an example onboard entertainment system 10 is illustrated. The onboard entertainment system 10 includes a computer management system 505. The computer management system 505 includes an entertainment system server 502. The entertainment system server 502 includes a processor 504, memory 506, a storage device 512 (e.g., for storing media such as movies, music, etc., to be distributed to each of the seat display systems 522), system software 508 for programming the processor 504 to perform the entertainment system functions, a display monitor 510 (e.g., a crew terminal), and a network adapter 514 (e.g., Ethernet adapter or other suitable network adapter). The computer management system 505 also has a network switch/router 516 for networking the computer management system 505 to each of the N number of seat display systems 522.

Each of the plurality of passenger seats 520 (only one passenger seat 520 is shown in FIG. 16, with the understanding that the onboard entertainment system 10 includes N number of such passenger seats 520) is equipped with a seat display system 522, and a docking cradle assembly 11 with a computing device 14 installed on the docking cradle assembly 11. The seat display system 522 includes a video display/smart monitor 524 and a network adapter 526 (e.g., Ethernet adapter or other suitable network adapter). The network adapter 526 is in network communication with the network switch/router 516, so that each of the N number of seat display systems 522 are in network communication with the entertainment system server 502. As described herein, the docking cradle assembly 11 and the computing device 14 are also in network communication with each other and the seat display system 522. Each passenger seat 520 may also include a power supply 528 that can be coupled to the docking cradle assembly 11 for transmitting power to the computing device 14 via the reciprocal connector 95. In some embodiments, the seat 520 may comprise the power interface 528 configured coupling the reciprocal connector 95 to a power supply 530 located external to the seat 520, for example, another location within the vehicle.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more.

The various illustrative logical or functional blocks and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative blocks and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

What is claimed is:

1. A docking cradle comprising:
   a housing having a first connector for receiving a computing device;
   a cover having an opening; and
   a connector assembly disposed between the housing and the cover, the connector assembly comprising a second connector, the second connector adjacent to the opening and rotatable between a plurality of positions, the plurality of positions comprising a first position, a second position, and one or more positions angularly displaced with respect to the first position and the second position, the second connector arranged to receive a reciprocal connector electrically coupled to an external system.

2. The docking cradle of claim 1, wherein the housing comprises a first side comprising the first connector and the cover comprises a second side comprising the opening, wherein the first side is substantially parallel with the second side.

3. The docking cradle of claim 1, wherein the first connector is positioned on a longitudinal surface of the housing, wherein the second connector is rotatable about a longitudinal axis that is substantially parallel to the longitudinal surface.

4. The docking cradle of claim 1, wherein the connector assembly comprises a connector housing supporting the second connector, wherein the connector assembly is rotatable between the plurality of positions.

5. The docking cradle of claim 1, wherein the cover comprises a first restraining member and a second restraining member adjacent to the opening, wherein the second connector is adjacent to the first restraining member when in the first position and is adjacent to second restraining member when in the second position.

6. The docking cradle of claim 1, wherein the first connector is configured to electrically couple the docking cradle to a computing device, and wherein the second connector is configured to electrically couple the computing device to a computer management system.

7. The docking cradle of claim 1, wherein the cover is mountable to a first surface and a second surface angularly displaced from the first surface by rotating the second connector to a position suitable for a selected mounting surface in which the second connector is inaccessible after the housing is mounted.

8. The docking cradle of claim 7, wherein the first surface is a vertical mounting surface, and, when the housing is mounted to the vertical mounting surface, the second connector is at one of the second position and one of the one or more angularly displaced positions.

9. The docking cradle of claim 8, wherein the second mounting surface is a horizontal mounting surface, and, when the housing is mounted to the horizontal mounting surface and to the vertical mounting surface, the second connector is at one of the first position, the second position, and one of the one or more angularly displaced positions.

10. The docking cradle of claim 7, wherein the second mounting surface is a horizontal mounting surface, and, when the housing is mounted to the horizontal mounting surface, the second connector is at one of the first position and one of the one or more angularly displaced positions.

11. The docking cradle of claim 1, wherein the connector assembly comprises at least one shaft having a first end and a second end comprising the second connector there between, wherein the docking cradle further comprises:
   one or more locking mechanisms disposed between the housing and the cover and adjacent to the connector assembly, the one or more locking mechanisms arranged to accept one of the first end and the second end of the at least one shaft; and
   one or more locking members coupled to the one or more locking mechanisms and arranged to adjust the at least one locking mechanism between a locked state and an unlocked state,
   wherein the second connector is locked in a selected position when in the locked state and rotatable when in the unlocked state.

12. The docking cradle of claim 11, wherein the at least one locking mechanism comprises a through hole for accepting one of the first end and the second end of the at least one shaft, wherein the locking member adjusts a diameter of the through hole.

13. The docking cradle of claim 12, wherein the at least one locking mechanism comprises:
   a first elongated member and a second elongated member, the first elongated member is closer to the housing than the second elongated member, wherein the through hole is between the first and second elongated members; and
   a gap between the first and second elongated members extending from at least the through hole to a distal end of second elongated member, wherein the at least one locking mechanism extends from the first elongated member, through the gap, to the second elongated member,
   wherein the locking member is operable to reduce the gap between the first and second elongated members to adjust the diameter of the through hole.

14. The docking cradle of claim 11, wherein the locking member is accessible from outside of the cover.

15. A docking station comprising:
   a housing having a first surface and a second surface, the second surface having a slot for receiving a computing device;
   a cover including a third surface and a fourth surface, and an opening, the third surface being substantially parallel with the first surface and adjacent to the second surface, the fourth surface being substantially parallel with the second surface and adjacent to the first surface; and
   a connector disposed adjacent to the opening and within a cavity between the housing and the cover, the connector rotatable between a plurality of positions, the plurality of positions comprising a first position, a second position, and one or more positions angularly displaced with respect to the first position and the second position, the connector arranged to receive an reciprocal connector electrically coupled to an external system.

16. The docking station of claim 15, wherein the opening is positioned on at least one of the third surface and the fourth surface.

17. The docking station of claim 16, wherein the opening is positioned on the third surface and the fourth surface traversing an edge of the third surface and fourth surface.

18. The docking station of claim 15, further comprising a rotatable member within the cavity, wherein the connector is affixed to a rotatable member arranged to rotate the connector between the plurality of positions about a longitudinal axis that is substantially parallel to the fourth surface.

19. The docking station of claim 18, further comprising one or more retaining blocks within the cavity and adapted to receive the rotatable member, the one or more retaining blocks having a locked state and an unlocked state, wherein the rotation member is rotatable while the one or more retaining blocks are in the unlocked state and the rotatable member is locked in a position while in the locked state.

20. The docking station of claim 15, wherein the slot is configured to electrically couple the docking station to the computing device, and the connector is configured to electrically couple the computing device to a computer management system.

* * * * *